(12) United States Patent
Fritz

(10) Patent No.: US 12,431,267 B2
(45) Date of Patent: Sep. 30, 2025

(54) ELECTRICAL FEEDTHROUGH

(71) Applicant: SCHOTT AG, Mainz (DE)

(72) Inventor: Oliver Wolfgang Fritz, Obersüssbach (DE)

(73) Assignee: SCHOTT AG, Mainz (DE)

( * ) Notice: Subject to any disclaimer, the term of this patent is extended or adjusted under 35 U.S.C. 154(b) by 650 days.

(21) Appl. No.: 17/586,916

(22) Filed: Jan. 28, 2022

(65) Prior Publication Data

US 2022/0246332 A1 Aug. 4, 2022

(30) Foreign Application Priority Data

Jan. 29, 2021 (DE) .................. 10 2021 102 037.9

(51) Int. Cl.
*H01B 17/30* (2006.01)
*H02G 1/00* (2006.01)
*H02G 3/22* (2006.01)

(52) U.S. Cl.
CPC ............. *H01B 17/301* (2013.01); *H02G 1/00* (2013.01); *H02G 3/22* (2013.01)

(58) Field of Classification Search
CPC .......... H01B 17/30; H01B 19/00; H01B 3/08; H01B 1/00; H01B 17/26; H01B 3/12; H01B 3/00; H01R 13/5216; H01R 13/5202; H01R 13/40; H01R 13/533; H01R 43/18; H01R 13/46; H01R 13/5219; H01R 13/53; H02G 3/22; H01F 27/04; H01F 27/02; H01H 9/02
USPC ............ 174/650, 142, 152 G, 153 G, 152 R, 174/138 R, 139, 138 F, 137 R, 5 R, 174/14 BH, 143, 152 GM; 16/2.1, 2.2
See application file for complete search history.

(56) References Cited

U.S. PATENT DOCUMENTS

| | | | |
|---|---|---|---|
| 3,998,515 A | 12/1976 | Panek | |
| 4,445,744 A * | 5/1984 | Sedig | H01R 13/521 439/271 |
| 6,229,093 B1 | 5/2001 | Haefele | |
| 9,553,398 B2 * | 1/2017 | True | H02G 3/22 |
| 9,577,416 B2 * | 2/2017 | Nisslbeck | H02G 3/22 |
| 9,966,169 B1 | 5/2018 | Xia | |
| 10,559,408 B2 * | 2/2020 | Sprengers | G02B 6/3897 |

(Continued)

FOREIGN PATENT DOCUMENTS

| | | |
|---|---|---|
| CN | 103474831 | 11/2015 |
| DE | 921511 | 12/1954 |

(Continued)

*Primary Examiner* — Angel R Estrada
(74) *Attorney, Agent, or Firm* — Ruggiero McAllister & McMahon LLC

(57) ABSTRACT

An electrical feedthrough is providing that includes a base body, an insulating material, an electrical conductor, a creepage distance extension, and a sealing member. The base body has a through opening extending therethrough. The insulating material is in the through opening. The electrical conductor extends through the insulating material such that a portion of the electrical conductor protrudes from the insulating material. The creepage distance extension surrounds at least a section of the portion. The sealing member is between the insulating material and the creepage distance extension. The sealing member is a seal material that is at least partially mineral and crystalline.

20 Claims, 2 Drawing Sheets

(56) References Cited

U.S. PATENT DOCUMENTS

| | | | |
|---|---|---|---|
| 10,741,311 B2 * | 8/2020 | Steinshorn | H02K 5/225 |
| 10,931,059 B1 * | 2/2021 | Kellogg | H01R 24/60 |
| 11,211,741 B2 * | 12/2021 | Marzano | H01G 4/35 |
| 11,980,766 B2 * | 5/2024 | Woods | A61N 1/05 |
| 2008/0314616 A1 | 12/2008 | Benestad | |
| 2016/0036016 A1 | 2/2016 | Dahlmann | |
| 2016/0049781 A1 | 2/2016 | Nisslbeck | |
| 2017/0175476 A1 | 6/2017 | Painter | |
| 2020/0203881 A1 | 6/2020 | Marzano | |

FOREIGN PATENT DOCUMENTS

| | | |
|---|---|---|
| DE | 1152169 | 8/1963 |
| DE | 102008045816 | 3/2010 |
| DE | 102009011182 | 9/2010 |
| DE | 102013006463 | 10/2014 |
| WO | 2014175744 | 10/2014 |
| WO | 2020254034 | 12/2020 |

\* cited by examiner

ELECTRICAL FEEDTHROUGH

CROSS REFERENCE TO RELATED APPLICATIONS

This application claims benefit under 35 USC § 119 of German Application 10 2021 102 037.9 filed Jan. 29, 2021, the entire contents of which are incorporated herein by reference.

BACKGROUND

1. Field of the Invention

The invention relates to an electrical feedthrough comprising at least one electrical conductor that extends through an insulating material.

2. Description of Related Art

Electrical feedthroughs which comprise a glass or glass ceramic component with electrical conductors extending therethrough and with the glass or glass ceramic component enclosed in a metallic base body are used in numerous applications. These applications include installations in the deep sea, such as, for example, in petroleum drilling or exploration equipment, or they are used in chemically or radiation-polluted environments such as in the chemical industry or in energy system and reactor technology. Further applications include, for example, manned and unmanned watercraft such as diving robots and submarines, as well as special gas tanks such as $CO_2$ storage tanks or $H_2$ tanks for fuel cell-driven motor vehicles.

In underwater applications such as in oil production, high temperatures, high pressures, and/or corrosive media may impose special requirements on electrical feedthroughs, in particular when accounting for service lives of around 20 years. In applications such as storage tanks which are employed to hold media such as liquid gas or liquid hydrogen, extremely low temperatures may occur to which the electrical feedthroughs will be exposed. In reactor applications in the field of civil nuclear power, such as, for example, high-temperature reactors, electrical feedthroughs sometimes have to withstand extremely high pressures, temperatures, and/or radiation, in particular over operating lifetimes of approximately 40 to 60 years. Even in Small Modular Reactors (SMRs), special requirements are imposed to electrical feedthroughs due to high pressures, temperatures, and/or radiation.

SUMMARY

Given this background, it is an object of the invention to provide electrical feedthroughs which are able to meet the aforementioned requirements, i.e. which in particular can durably withstand high pressures, high and low temperatures, corrosive media, and/or radiation exposure and can be reliably operated overlong operating lifetimes.

In order to achieve this object, the invention discloses an electrical feedthrough comprising a base body with a through opening extending therethrough, an insulating material which is received in the through opening of the base body, and at least one electrical conductor extending through the insulating material and with a portion thereof protruding from the insulating material.

The electrical feedthrough further comprises a creepage distance extension which surrounds the protruding portion of the electrical conductor at least in sections thereof, and a sealing member which is arranged between the insulating material and the creepage distance extension, the material of the sealing member being at least partially, preferably predominantly mineral and crystalline in nature.

The sealing member therefore preferably consists of mineral, crystalline material. The sealing member is preferably made of a different material or comprises a different material than the insulating material and/or than the creepage distance extension. Furthermore, the sealing member preferably has a different structure than the insulating material, in particular a different crystal structure. More particularly, the material of the sealing member preferably includes a greater proportion of crystalline material per volume than the insulating material. In particular, it may be contemplated that the sealing member comprises less than 10 percent, preferably less than 1 percent of amorphous material or most preferably no or essentially no amorphous material at all.

The sealing member comprising mineral and crystalline material advantageously allows in particular for a fluid-tight seal between the creepage distance extension and the insulating material, which withstands high and low temperatures and/or high pressures, and preferably resists upon contact with corrosive media or radiation, and furthermore guarantees a long service life. This is in particular an advantage over common organic-based materials, in particular plastics materials which can degrade at high or low temperatures, for example, and which sometimes undergo an aging process that does not provide for a sufficient service life.

Furthermore, the material of the sealing member can be at least partially, preferably predominantly inorganic. Accordingly, the sealing member may consist of mineral, crystalline, inorganic material. Inorganic material has the particular advantage of not aging, in particular not aging under radiation, and is thus capable of ensuring a long service life of a seal and an electrical feedthrough. In addition, inorganic material can be used at higher and lower temperatures than epoxies or other plastics materials.

Since the material of the sealing member comprises or is made of mineral and crystalline material, especially in the case of inorganic material, advantages result from the similarity of the material class of an insulating material that comprises glass, for example an insulating material comprising or made of glass or glass ceramics. It is in particular possible that bonds are resulting or are provided between the same ingredients. The electrical feedthrough accordingly comprises in particular components which are a combination of inorganic materials.

Furthermore, the sealing member or the material of the sealing member preferably has a lower hardness than the insulating material and/or than the creepage distance extension. The sealing member or the material of the sealing member may have a Mohs hardness of less than 6, preferably less than 5, more preferably less than 4, most preferably less than 3. A low hardness has the advantage that the material can be compressed and can compensate for surface unevenness. In this way it is possible to achieve a desired tightness even with minor unevenness.

In addition, the sealing member or the material of the sealing member has a specific resistance of more than $1 \cdot 10^{13}$ $\Omega mm^2/m$, preferably of more than $1 \cdot 10^{14}$ $\Omega mm^2/m$, more preferably of more than $1 \cdot 10^{15}$ $\Omega mm^2/m$, most preferably of more than $1 \cdot 10^{16}$ $\Omega mm^2/m$. Accordingly, the sealing member preferably comes in the form of an electrical insulator, i.e. is highly electrically insulating.

The insulating material located in the through opening of the base body preferably comprises glass, glass-ceramic material, and/or ceramic material or is made of such a material.

The insulating material is preferably surrounded by the base body and is thereby under compressive stress and preferably forms a compression glass seal. Most preferably, the insulating material establishes a fluid-tight and/or gas-tight joint between the base body and the electrical conductor.

In a preferred embodiment, the material of the sealing member comprises a sheet silicate, in particular mica. However, the sealing member may, for example, also comprise a ceramic material or be in the form of a ceramic material which is plastically deformable by at least 1 percent, preferably plastically deformable by at least 3 percent, most preferably plastically deformable by at least 5 percent. For example, strontium titanate ($SrTiO_3$) can be used as such a soft ceramic.

In particular in the case where the material of the sealing member comprises or is made of a sheet silicate, advantages arise from the similarity of the material class of an insulating material that comprises glass, for example an insulating material comprising or made of glass or glass ceramics. For example, chemical resistance to corrosion may be comparable or similar. In particular, bonds can be established or produced between the same ingredients, for example under pressure, between the surfaces of the sealing member and the insulating material.

The sealing member is preferably compressed between the insulating material and the creepage distance extension. Hence, the sealing member is preferably subjected to pressure by being arranged between the insulating material and the creepage distance extension. Most preferably, the sealing member establishes a fluid-tight joint between the insulating material and the creepage distance extension.

In a preferred embodiment, the sealing member and the insulating material are firmly bonded to one another. The insulating material can be fused to the sealing member, in the case of an insulating material that comprises glass, the insulating material may be glass-fused to the sealing member.

In an exemplary embodiment of the electrical feedthrough, the creepage distance extension is fastened to the base body, for example by means of a clamping ring as a fastening means. In this embodiment, but in principle also more generally, the creepage distance extension can be spaced apart from the electrical conductor by a gap, in particular in order to compensate for different thermal expansions.

In a further exemplary embodiment of the electrical feedthrough, the creepage distance extension is fastened to the electrical conductor by means of a nut as a fastening means, for example. In this embodiment, in principle but also more generally, the creepage distance extension can be spaced apart from the base body by a gap, in particular in order to compensate for different thermal expansions.

More generally, it may be contemplated that the creepage distance extension bears against the fastening means and presses against the sealing member. In this way, fixation and compression of the sealing member can be achieved in an advantageous manner.

A spring element may be arranged between the fastening means and the creepage distance extension, in particular to compensate for material settling of the sealing member and/or to compensate for different thermal expansions of the components of the electrical feedthrough upon temperature changes. The term 'thermal expansion' refers to both increases in dimensions (expansion) and reductions in dimensions (shrinkage) upon temperature changes. For example, a plate spring or a wave spring may be arranged between the fastening means and the creepage distance extension, in particular between the nut or the clamping ring and the creepage distance extension. This allows to compensate for different changes in length, in particular in the case of temperature variations, and/or to maintain the compression of the sealing member.

The creepage distance extension can exert a surface pressure of at least 2 MPa, preferably at least 10 MPa, most preferably at least 40 MPa on the sealing member.

The base body of the electrical feedthrough may comprise or be made of a metal, in particular an alloy.

The creepage distance extension of the electrical feedthrough may comprise or be made of a ceramic and/or oxide-ceramic material, for example aluminum oxide.

The invention also relates to the use of an electrical feedthrough, in particular one as described above, in an application which involves pressures of at least 5 bar, preferably of at least 10 bar, most preferably of at least 20 bar, and/or in an application which involves temperatures of at least −273° C., preferably of at least 300° C., most preferably of at least 600° C., and/or in an application which involves gamma ray radiation exposure of at least 1 kGy, preferably of at least 1 MGy, most preferably of at least 20 MGy, the specified values of gamma ray radiation exposure in particular being meant over the entire service life of the electrical feedthrough.

Furthermore, the invention relates to the use of an electrical feedthrough, in particular one as described above, for installations in the deep sea, such as in petroleum and/or natural gas drilling or exploration equipment, and/or in chemically or radiation-polluted environments such as in the chemical industry or in energy system and reactor technology, in particular in potentially explosive areas, in a power generation apparatus or energy storage apparatus having a housing, or in an encapsulation of a power generation apparatus or of an energy storage apparatus or of a reactor or a storage tank for toxic and/or hazardous matter, in particular as a feedthrough device in the containment of a reactor or a feedthrough device through the containment of a reactor, in particular a chemical or nuclear reactor, or in a spacecraft or space exploration vehicle, or in a housing of a sensor and/or actuator, in or on manned and unmanned watercraft such as diving robots and submarines, and in gas tanks, in particular $CO_2$ storage tanks or $H_2$ tanks, preferably also for fuel cell-driven motor vehicles.

Finally, the invention relates to a method for producing an electrical feedthrough, in particular one as described above, comprising the fusing of the insulating material into the through opening that extends through the base body, and the fusing of the insulating material to the sealing member.

It may be contemplated for the method that the fusing of the insulating material, in particular a glass, into the through opening that extends through the base body and the fusing of the insulating material to the sealing member are performed simultaneously at a particular temperature.

Furthermore, it may be contemplated for the method that, first, the insulating material, in particular a glass-ceramic material, is fused into the through opening that extends through the base body at a first temperature, and that subsequently the insulating material is fused to the sealing member at a lower, second temperature.

BRIEF DESCRIPTION OF THE DRAWINGS

The invention will now be described in more detail by way of exemplary embodiments and with reference to the accompanying drawings, wherein.

DETAILED DESCRIPTION

Figure 1:
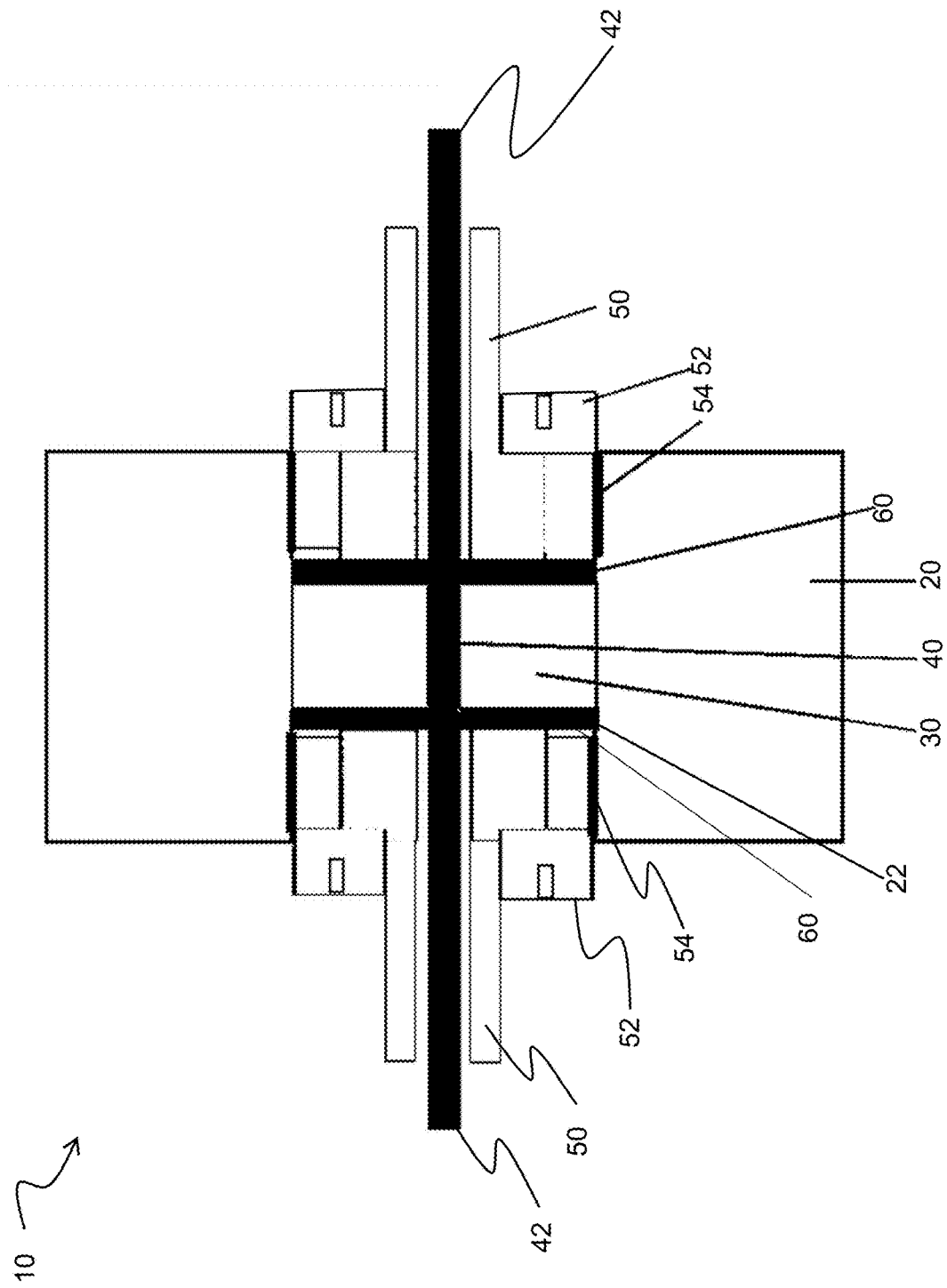
FIG. 1 shows a cross-sectional view through a first exemplary embodiment of an electrical feedthrough.

FIG. 1 shows an electrical feedthrough 10 comprising a base body 20 in the form of an outer flange with a through opening 22 extending therethrough. Inside the through opening 22, there is insulating material 30 provided under compressive stress in the form of a fused-in sealing glass or a compression glass seal.

An electrical conductor 40 extends through the insulating material 30 and has a respective portion 42 protruding from the insulating material 30 on both sides thereof. In the illustrated example, the protruding portion 42 also protrudes beyond the base body 20 which in this case protrudes from the insulating material 30, so that the insulating material 30 is recessed in the base body 20.

By virtue of the insulating material 30, the electrical conductor 40 is joined to the base body 20 in a gas-tight manner and is electrically insulated therefrom. In order to prevent undesirable creepage currents between the protruding portions 42 of the conductor 40 and the base body 20 during operation, the protruding portion 42 of the electrical conductor 40 is accommodated in a creepage distance extension 50 surrounding the electrical conductor 40. The creepage distance extension 50 may be in the form of an electrically insulating tube, for example, such as an aluminum oxide tube.

Between the insulating material 30 and the creepage distance extension 50, a sealing member 60 is arranged which ensures a fluid-tight joint between the insulating material 30 and the creepage distance extension 50. The material of the sealing member 60 is at least partially, preferably predominantly mineral and crystalline. For example, the sealing member 60 may be in the form of a sheet silicate disk.

The creepage distance extension 50 is fastened to the base body 20 by means of a clamping ring 52. For this purpose, the clamping ring 52 has a thread 54 screwed into the through opening 22 of the base body 20. As a result, the sealing member 60 is put under pressure and is thus clamped between the insulating material 30 and the creepage distance extension 50.

The sealing member 60, for example comprising or consisting of a sheet silicate, is capable of yielding somewhat under the pressure so as to compensate for potential unevenness both on the adjoining surface of the insulating material 30 and on the adjoining surface of the creepage distance extension 50. Optionally, a spring element, not illustrated here, may additionally be provided between the clamping ring 52 and the creepage distance extension 50.

Figure 2:
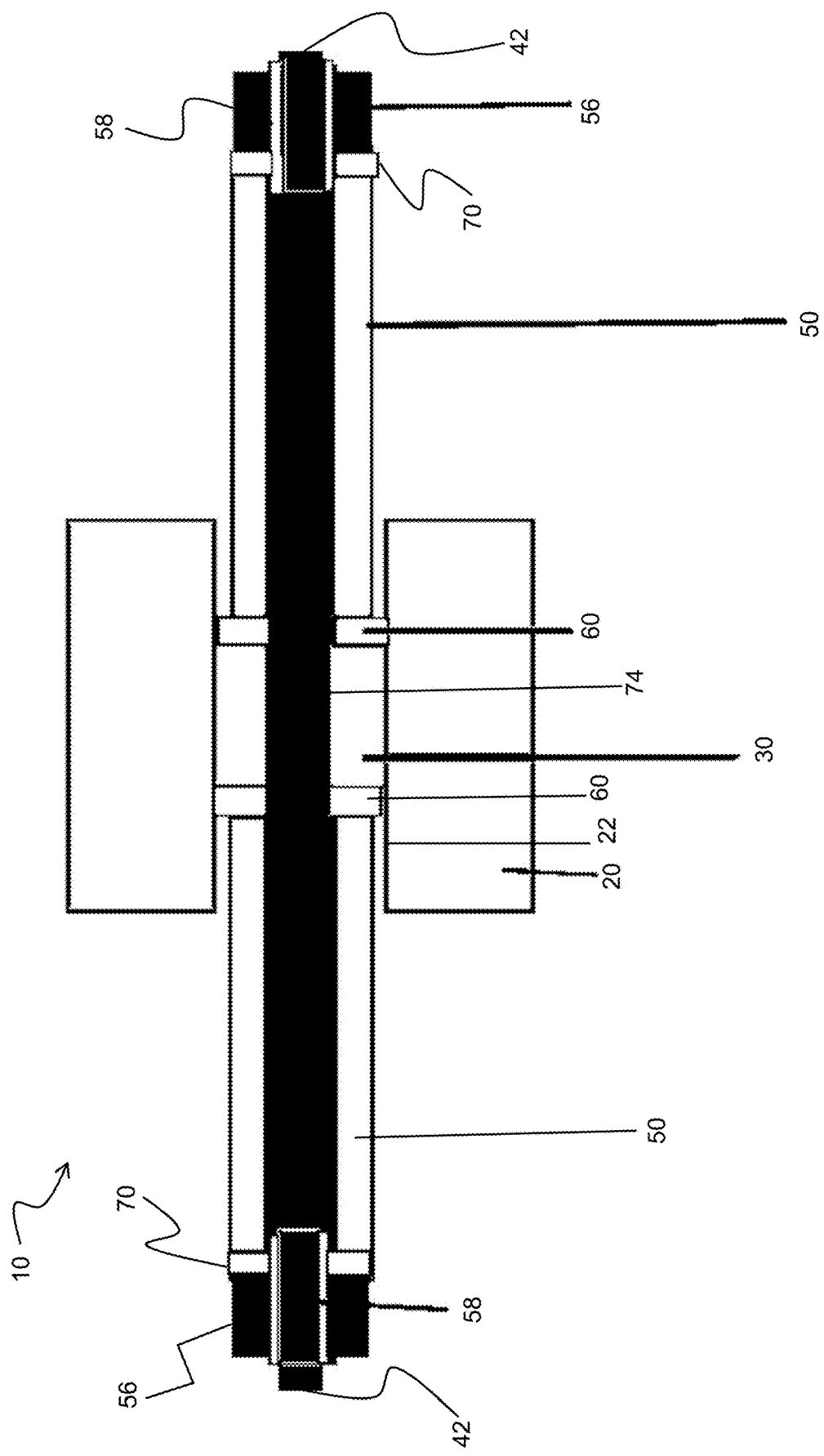
FIG. 2 shows a cross-sectional view through a second exemplary embodiment of an electrical feedthrough.

FIG. 2 shows a further electrical feedthrough 10 which in some aspects is similar to the feedthrough illustrated in FIG. 1. However, in this electrical feed-through 10, the creepage distance extension 50 is fastened to the conductor 40 by means of a nut 56. For this purpose, the nut 56 has a thread 58 and is screwed onto the protruding portion 42 of the conductor 40.

In order to better compensate for settlement of the material of the sealing member 60 and to compensate for material expansions, in particular in the case of temperature variations, a spring member 70 is moreover arranged between nut 56 and creepage distance extension 50. As a matter of course, a spring element may also be provided in the feedthrough 10 shown in FIG. 1, between clamping ring 52 and creepage distance extension 50.

In the case of a feedthrough comprising a plurality of electrical conductors 40 extending through the insulating material 30, the protruding portions 42 of all conductors 40 are preferably surrounded by one or more creepage distance extensions 50. This also allows to prevent undesired creepage currents between adjacent conductors. In this case, the creepage distance extensions 50 can be pressed against the sealing member 60 simultaneously, for example by a plate.

In a preferred embodiment, the insulating material 30 may be fused to the sealing member 60. For this purpose, according to the method, the insulating material 30 can be fused into the through opening 22 that extends through the base body 20 and, either at the same time or subsequently, the insulating material 30 can be fused to the sealing member 60.

For example, surprisingly, it has been found that in the case of sealing members made of sheet silicates such as mica, the insulating material comprising glass can be permanently fused to a sealing member. In one example, a sealing glass (Schott 8421) was fused to mica. For this purpose, a common melting process was simulated (930° C./45 min) while a glass compact was fused to cardboard-shaped mica paper. Not only did the glass firmly bond to the mica disk, but even well wetted without any additional weight load.

If a sealing member comprising or made of mica, such as a mica disk, is already introduced during the fusing process, the side of the sealing member facing the glass can be firmly bonded, in particular bonded in a gas-tight and/or fluid-tight manner.

What is claimed is:

1. An electrical feedthrough, comprising:
    a base body having a through opening that extends through the base body;
    an insulating material in the through opening;
    an electrical conductor extending through the insulating material such that a portion of the electrical conductor protrudes from the insulating material;
    a creepage distance extension surrounding at least a section of the portion; and
    a sealing member between the insulating material and the creepage distance extension,
    wherein the sealing member comprises a seal material that is at least partially mineral and crystalline.

2. The electrical feedthrough of claim 1, wherein the seal material is predominantly mineral and crystalline.

3. The electrical feedthrough of claim 1, wherein the seal material is at least partially inorganic.

4. The electrical feedthrough of claim 1, wherein the sealing member has a Mohs hardness of less than 6.

5. The electrical feedthrough of claim 1, wherein the sealing member has a specific resistance of more than $1 \cdot 10^{13}$ $\Omega mm^2/m$.

6. The electrical feedthrough of claim 1, wherein the insulating material comprises a material selected from a group consisting of glass, glass-ceramic, ceramic material, and any combinations thereof.

7. The electrical feedthrough of claim 1, wherein the insulating material is surrounded by the base body under compressive stress so as to form a compression glass seal between the base body and the electrical conductor.

8. The electrical feedthrough of claim 7, wherein the compression glass seal is a gas-tight joint.

9. The electrical feedthrough of claim 1, wherein the seal material comprises a sheet silicate or mica.

10. The electrical feedthrough of claim 1, wherein the sealing member is compressed between the insulating material and the creepage distance extension.

11. The electrical feedthrough of claim 10, wherein the sealing member establishes a fluid-tight joint between the insulating material and the creepage distance extension.

12. The electrical feedthrough of claim 1, wherein the insulating material is glass- fused to the sealing member.

13. The electrical feedthrough of claim 1, wherein the creepage distance extension is fastened to the base body by a fastener.

14. The electrical feedthrough of claim 13, wherein the creepage distance extension is fastened to the base body with a gap between the creepage distance extension and the electrical conductor, the gap being positioned and configured to compensate for different thermal expansions.

15. The electrical feedthrough of claim 13, wherein the creepage distance extension bears against the fastener and presses against the sealing member.

16. The electrical feedthrough of claim 13, further comprising a spring element between the fastener and the creepage distance extension, the spring being positioned and configured to compensate for material settling of the sealing member and/or to compensate for different thermal expansions.

17. The electrical feedthrough of claim 13, wherein the creepage distance extension exerts a surface pressure of at least 2 MPa on the sealing member.

18. The electrical feedthrough of claim 1, wherein the creepage distance extension comprises a material selected from a group consisting of ceramic, oxide-ceramic material, aluminum oxide, and any combinations thereof.

19. The electrical feedthrough of claim 1, wherein the electrical feedthrough is configured for a use selected from a group consisting of: the use involving pressures of at least 5 bar, the use involving pressures of at least 10 bar, the use involving pressures of at least 20 bar, the use involving temperatures of at least $-273°$ C., the use involving temperatures of at least 300° C., the use involving temperatures of at least 600° C., the use involving gamma ray radiation exposure of at least 1 kGy, the use involving gamma ray radiation exposure of at least 1 MGy, the use involving gamma ray radiation exposure of at least 20 MGy, the use involving installations in the deep sea, the use involving petroleum drilling equipment, the use involving petroleum exploration equipment, the use involving natural gas drilling equipment, the use involving natural gas exploration equipment, the use involving chemically-polluted environments, the use involving radiation-polluted environments, the use involving chemical industry equipment, the use involving energy industry equipment, the use involving reactor technology, the use involving explosive areas, the use involving power generation apparatus, the use involving energy storage apparatus, the use involving an encapsulation of a power generation apparatus, the use involving an encapsulation of an energy storage apparatus, the use involving a reactor for hazardous matter, the use involving a reactor for hazardous matter, the use involving a storage tank for toxic matter, the use involving a storage tank for hazardous matter, the use involving a containment for a chemical reactor, the use involving a containment for a nuclear reactor, the use involving a spacecraft, the use involving a space exploration vehicle, the use involving a housing of a sensor, the use involving a housing of an actuator, the use involving a manned watercraft, the use involving an unmanned watercraft, the use involving a diving robot, the use involving a submarine, the use involving a gas tank, the use involving a $CO_2$ storage tank, the use involving an $H_2$ storage tanks, the use involving a fuel cell-driven vehicle, and any combinations thereof.

20. A method for producing an electrical feedthrough, comprising:
  providing a base body having a through opening that extends through a base body;
  providing an electrical conductor into the through opening with at least a portion of the electrical conductor being surrounded by a creepage distance extension;
  providing a sealing member at the creepage distance extension, wherein the sealing member comprises a seal material that is at least partially mineral and crystalline; and
  fusing an insulating material to the sealing member and in the through opening such that the portion of the electrical conductor protrudes from the insulating material.

* * * * *